(No Model.)
O. A. ENHOLM.
COMPOSITION FOR LINING ELECTRIC BATTERY JARS.
No. 415,962. Patented Nov. 26, 1889.
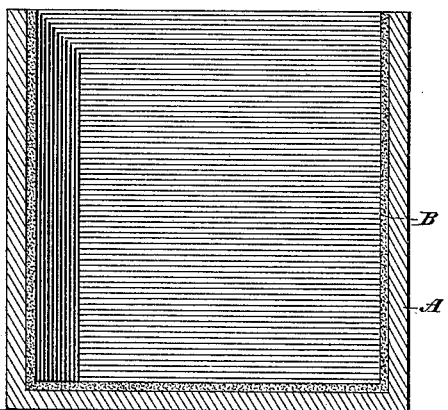
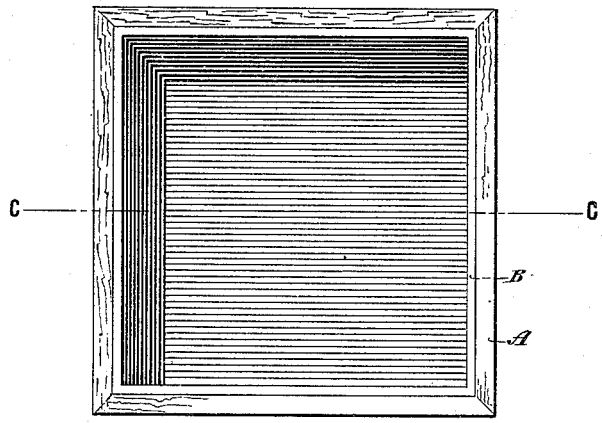
WITNESSES:
Gustave Dieterich
T. Fred. Bourne
INVENTOR
Oscar A. Enholm.
BY
Briesen, Steele & Knauth
ATTORNEYS.

UNITED STATES PATENT OFFICE.

OSCAR A. ENHOLM, OF NEW YORK, N. Y., ASSIGNOR OF ONE-SIXTH TO IVAR H. ENHOLM, OF SAME PLACE.

COMPOSITION FOR LINING ELECTRIC-BATTERY JARS.

SPECIFICATION forming part of Letters Patent No. 415,962, dated November 26, 1889.

Application filed April 19, 1889. Serial No. 307,701. (No specimens.)

*To all whom it may concern:*

Be it known that I, OSCAR A. ENHOLM, a resident of the city, county, and State of New York, have invented an Improved Composition for Lining Electric-Battery Jars and for Analogous Purposes, of which the following is a specification.

The object of my invention is to provide a composition for lining electric-battery jars, and for analogous purposes, which will withstand the action of chemicals, and at the same time be durable in use, of light weight, and be cheap to manufacture.

Reference is to be had to the accompanying drawings, forming part of this specification, wherein—

Figure 1 is a vertical cross-section on the line $c\ c$, Fig. 2, of a battery-jar lined with my improved composition; and Fig. 2 is a plan view of the same.

My composition consists of the following ingredients, viz: mineral wax, ground glass, (or, if preferred, French clay or analogous material,) sulphur, and rosin. I find a good proportion of parts to be as follows: mineral wax, fifty per cent.; sulphur, twenty-five per cent.; ground glass, (or clay,) fifteen per cent.; rosin, ten per cent.; but I desire it to be understood that I do not confine myself to the above proportions of parts.

In preparing my composition I first melt the wax and then add to it the sulphur, and thoroughly mix the same, so that the sulphur will combine with the wax. I next add to the above mixture, while still heated, the ground glass (or its equivalent, such as clay) and rosin, and mix the mass thoroughly. The composition is now ready for use, and it can be molded or spread out in any desired shape, it being a semi-liquid mass when heated. When cool, the composition becomes firm, solid, and tough.

In making a battery-jar I take a box or other suitable receptacle A, and line the same with a layer of the above-described composition B, as shown in the drawings. The box A may be made of wood, if desired, in order to combine lightness and strength with cheapness, or of any other desired material. The lining B of my composition should be spread out in a layer of suitable thickness, and be so joined in the corners of the box or receptacle A that there shall be no cracks or seams.

The above-described composition is especially applicable to the construction of battery-jars, as the chemicals used in the battery have no effect upon the composition.

Having now described my invention, what I claim is—

The herein-described composition, consisting of mineral wax, sulphur, ground glass, and rosin, combined substantially as specified.

OSCAR A. ENHOLM.

Witnesses:
   T. F. BOURNE,
   HARRY M. TURK.